Patented Mar. 30, 1954

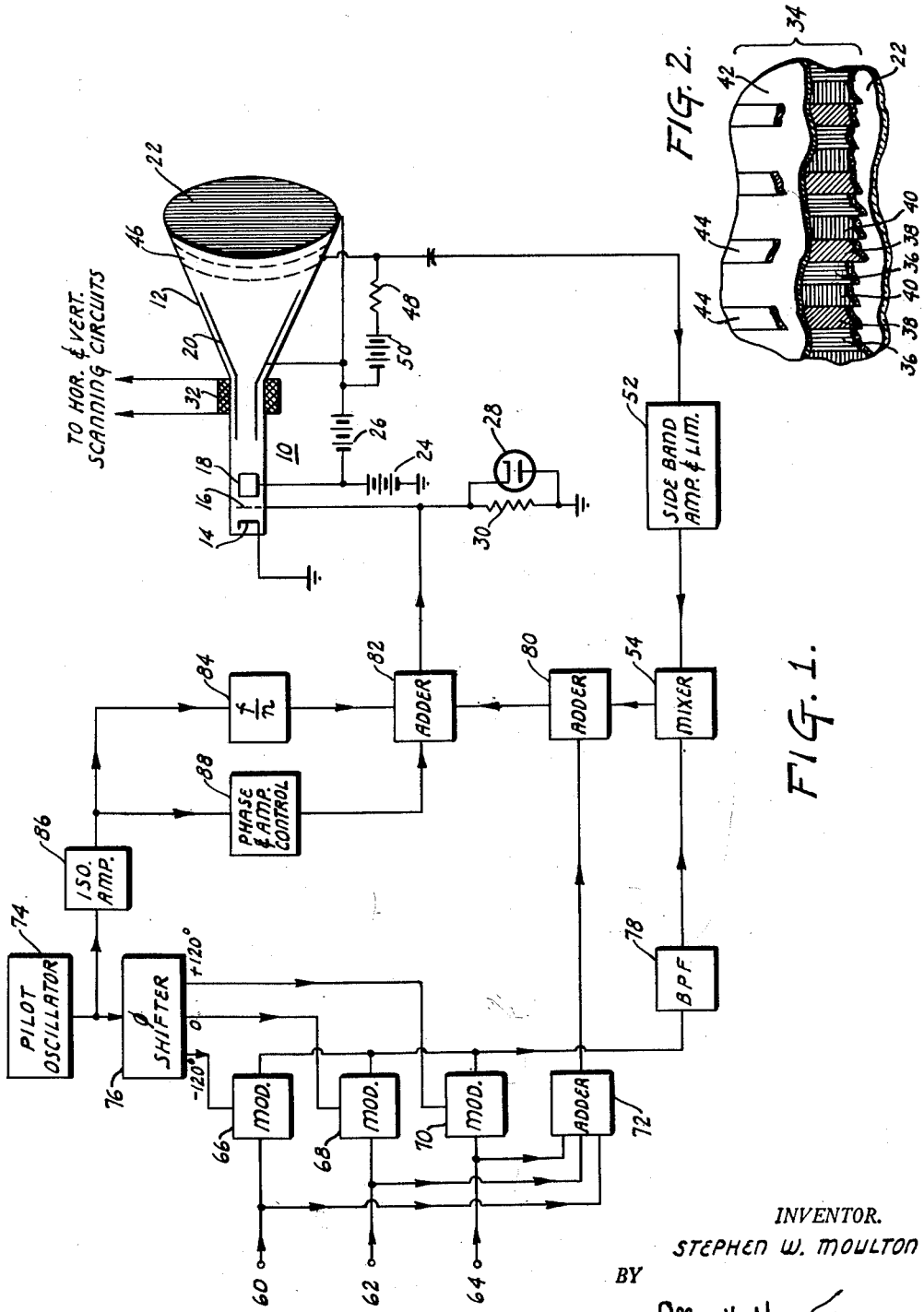

2,673,890

UNITED STATES PATENT OFFICE 2,673,890

COLOR CATHODE-RAY TUBE REGISTRATION SYSTEM

Stephen W. Moulton, Johnsville, Pa., assignor to Philco Corporation, Philadelphia, Pa., a corporation of Pennsylvania Application July 11, 1951, Serial No. 236,236

8 Claims. (Cl. 178—5.4)

The present invention relates to electrical systems and more particularly to cathode-ray tube systems comprising a beam intercepting member and an indexing member arranged in cooperative relationship with the beam intercepting member and adapted to produce a signal whose time of occurrence is indicative of the position of the cathode-ray beam relative to the beam intercepting member.

The invention is particularly adapted for use and will be described in connection with a color television image presentation system utilizing a single cathode-ray tube having a beam intercepting, image forming screen member comprising vertical stripes of luminescent materials. These stripes are preferably arranged in laterally-displaced color triplets, each triplet comprising three vertical phosphor stripes which respond to electron impingement to produce light of the different primary colors. The order of arrangement of the stripes may be such that the normally horizontally-scanning cathode-ray beam produces red, green and blue light successively. From a color television receiver there may then be supplied three separate video signals, each indicative of a different primary color component of a televised scene, which signals are sampled sequentially and utilized to control the intensity of the cathode-ray beam. For proper color rendition, it is then required that, as the phosphor stripes producing each of the primary colors of light are impinged by the cathode-ray beam, the intensity of the beam be simultaneously controlled in response to the contemporaneous value of the video signal representing the corresponding color component of the televised image. However, since the rate at which the beam scans across the phosphor stripes of the screen may vary, due, for example, to non-linearity of the beam deflecting signal or due to a non-uniform distribution of the color triplets on the screen surface, the times at which the samples of the several video color signals should be taken will generally not occur exactly periodically. To obtain proper timing of the sampling operations, it is therefore desirable to derive signals indicative of the instantaneous position of the cathode-ray beam upon the image-forming screen, and to utilize these indexing signals to control the times at which samplings of the several color signals are effected. The said indexing signals may be derived from a plurality of stripe members arranged on the beam intercepting screen structure so as to be indicative of the location of the color triplets. Thus the index stripes may be arranged each adjacent a triplet, so that, when the beam scans the screen, the indexing stripes are excited in spaced time sequence relative to the scanning of the color triplets and a series of pulses is generated in a suitable output electrode system of the cathode-ray tube.

The indexing stripes may comprise a material having secondary-emissive properties which differ from the secondary-emissive properties of the remaining portions of the beam intercepting structure. For example, the indexing stripes may consist of a high atomic number material such as gold, platinum or tungsten or may consist of certain oxides such as magnesium oxide, and the remainder of the beam intercepting structure may be provided with a coating of a material having a detectably different secondary-emissive ratio, such as aluminum, which coating also serves as a light reflecting mirror for the phosphor stripes in accordance with well known practice. With such an arrangement the indexing signals may be derived from a collector electrode arranged in the vicinity of the screen structure. Alternatively, the indexing stripes may consist of a fluorescent material, such as zinc oxide, having a spectral output in the non-visible light region and the indexing signals may be derived from a suitable photo-electric cell arranged, for example, in a side wall portion of the cathode-ray tube out of the path of the cathode-ray beam and facing the beam intercepting surface of the screen structure.

In practice there exists the danger that the normally detectable voltage indicating the impingement of the beam onto the indexing stripes may be masked or at least contaminated by spurious voltages. More particularly, it is found that, at the high accelerating voltages of the order of 10 to 20 kilovolts used in the cathode-ray tubes for the systems under consideration, only a relatively small difference in the secondary-emissive ratio of the materials of the indexing stripes and of the remainder of the screen structure can be realized and that, in the heretofore proposed systems, the presence of video signals and noise voltages in the collector electrode system may significantly diminish the effective value of the indexing signal. Similarly, in those instances in which the indexing signal is produced by means of a photo-electric detector and indexing stripes comprising a fluorescent material which produces light in the non-visible region of the spectrum, the detector may also be actuated by soft X-rays which are produced by the high voltage beam or by extraneous light from sources external to the cathode-ray tube or from the phosphor stripes of the color triplets, the latter light in some instances penetrating the aluminum mirror coating superimposed on the color stripes.

In the copending application of E. M. Creamer, Jr., et al., Serial No. 240,324, filed August 4, 1951, there have been described systems by means of which the desired indexing information may be obtained in a readily usable form with a minimum of components at the video signal frequencies appearing in the indexing signal circuits. More particularly, and in accordance with the principles set forth in the said copending application, use is made of the finding that the scanning of the indexing stripes by the electron beam will produce, in the collector circuit of the cathode-ray tube, signal components which represent modulation products as determined by the intensity variations of the beam and the rate of scanning of the index stripes. Accordingly, by additionally varying the intensity of the beam at a pilot carrier rate widely different from the rate at which the beam intensity is varied by the video signal, an output signal is produced in the collector electrode of the cathode-ray tube comprising, as one component, modulation products proportional to the pilot carrier frequency and the rate of scanning the index stripes. Because of their widely different frequency range, these modulation products may readily be separated from those generated modulation products which are proportional to the video signal frequencies and the rate of scanning of the index stripes. The pilot carrier modulation products consist essentially of a carrier wave at the pilot carrier frequency and sidebands representing the sum and difference of the pilot carrier frequency and the rate of scanning the index stripes. Any change in the rate of scanning of the index stripes will be indicated by a change in the frequencies of the sidebands, and accordingly the separated signal or one of its sidebands may be utilized as an indexing signal of high quality.

In some instances, secondary factors within the cathode-ray tube system above described may operate to contamintae the indexing signal so produced, so that the signal is no longer precisely definitive of the absolute position of the cathode-ray beam. More particularly, it has been found that, due to manufacturing tolerances of the beam generating elements of the cathode-ray tube, the beam-current versus control-voltage characteristic of the cathode-ray tube may exhibit serious departures from linearity so that undesirable cross-modulation effects may be produced when the video signal and the pilot carrier signal are applied to the intensity control element thereof. The cross-modulation products so produced, introduce new components which similarly vary the intenstiy of the beam and appear as spurious signals in the index output circuit of the cathode-ray tube. Since the heterodyne components of the cross-modulation products may have frequencies within the frequency band of the indexing signal, their presence may undesirably affect the system operation and bring about inaccurate or at least degraded reproduction of the colors of the image. These conditions may be ameliorated to some extent by the use of a relatively large pilot carrier signal. However, the use of large pilot carrier signal amplitudes may in turn bring about undesirable desaturation of the colors of the reproduced image.

It is an object of the invention to provide an improved cathode-ray tube system of the type in which the position of a cathode-ray beam relative to a beam intercepting member of a cathode-ray tube is indicated by a signal produced by an indexing member arranged in cooperative relationship to the beam intercepting member.

Another object of the invention is to provide a cathode-ray tube system of the type in which the position of the ctahode-ray beam is indicated by a signal produced by an associated indexing member and in which a clearly defined indexing signal is generated.

A further object of the invention is to provide a cathode-ray tube system operating on principles above outlined, and in which spurious signals normally brought about by a cross-modulation action of video and carrier signals applied to the beam intensity control electrode of a cathode-ray tube are avoided.

Another object of the invetnion is to provide a cathode-ray tube system of the type above described, by means of which a large indexing signal may be produced without significant desaturtaion of the colors of the image.

These and further objects of the invention will appear as the specification progresses.

In accordance with the invention, the foregoing objects are achieved by employing a cathode-ray tube having disposed therein a beam intercepting structure comprising beam position indicating elements arranged in predetermined geometric relationship to other portions of the beam intercepting structure. These beam indicating elements, as above pointed out, may be in the form of spaced indexing stripes, and are characterized by values of secondary-emissive ratio or by spectral emission characteristics which differ from those characterizing other regions of the beam intercepting structure when electrons of the cathode-ray beam impinge thereon. When the intensity of the beam is simultaneously varied at a pilot carrier rate and at a rate determined by a color video signal having color information occurring at the repetition rate at which successive color triplets of the beam intercepting structure are scanned, the action of the beam, as it simultaneously scans the indexing stripes, will in turn produce secondary electrons which generate, in the output circuit of the tube, two component signals. One of the component signals has a frequency proportional to the product of the video signal intensity variations of the beam and the rate of scanning of the indexing stripes, and the other of the component signals has a frequency proportional to the pilot frequency intensity variations of the beam and the rate of scanning of the indexing stripes. Since the latter component signal may be made to have a frequency spectrum widely separated from the frequency spectrum of the first component signal by an appropriate selection of the pilot frequency, the two components may be readily separated in the output collector sytsem of the cathode-ray tube. Furthermore, since the sidebands of the said latter component are determined by the algebraic sum of the pilot frequency and the rate of scanning of the index stripes, any departures of the scanning velocity of the beam from linearity or non-uniformities in the position and distribution of the index stripes will be reflected as a change in the frequency of the sidebands, and accordingly the latter component or a sideband thereof may be utilized as an indexing signal.

When the simultaneous variation of the intensity of the beam is effected by applying a video signal and a pilot carrier wave to the control electrode of the cathode-ray tube, it is found that, in some instances, the non-linearity of the beam-current versus control-voltage characteristic of the tube may produce cross-modulation products of the applied signals, and thereby produce undesired signals which additionally vary the intensity of the beam. These additional variations of the intenstiy of the beam may produce spurious signals in the index output circuit of the tube because they represent sum and difference frequencies which are the same as the sum and difference frequencies produced by the heterodyne action of the pilot carrier wave and the index stripes.

In accordance with the invention, the simultaneous variation of the intensity of the cathode-ray beam at the impressed video color wave frequency and at the desired pilot frequency is effected, without simultaneously varying the intensity of the beam at frequencies producing undesired spurious signals in the index output circuit of the tube, by applying to the control system of the tube the video signal together with a signal having a component at a frequency which is a subharmonic of the desired pilot intensity variation rate. As a general rule, the non-linear characteristic of the cathode-ray tube approximates a square law relationship, i. e., the beam-current versus control-voltage parameters are related by a non-linear expression, one term of which is an exponential to the second power. Therefore, in the usual case, the signal applied to the control elements of the tube in accordance with the invention, will have a frequency equal to one-half of the desired pilot frequency.

The video color signal and the subharmonic signal applied to the cathode-ray tube will be acted upon by the non-linear characteristic of the tube so that the beam is varied in intensity not only at the video rate but also at rates proportional to the sum and difference frequencies of the two applied signals and at rates which are harmonics of the frequenceis of the applied signals. It can be shown that, when the beam-current versus control-voltage characteristic of the tube has a square law relationship, the amplitude of the second harmonic of the pilot frequency generating signal will be independent of the amplitude of the video signal applied to the beam control means. Therefore, the intensity of the beam may be varied at the desired pilot rate without there occurring spurious variations of the beam at the pilot rate due to the coexisting video signal. Furthermore, the harmonic frequency of the applied pilot frequency determining signal may be sufficiently removed from the frequencies of the other variations of the beam, or from the heterodyne products produced by such other variations during the scanning of the indexing stripes, so that the desired index signal may readily be separated in the index output circuit of the tube. Similar considerations apply to cathode-ray tubes having a non-linear characteristic approximating higher order relationships, e. g., a third order relationship, in which case a signal having a component at a corresponding subharmonic is preferably applied to the tube as the pilot frequency determining signal.

The invention will be described in greater detail with reference to the appended drawings forming part of the specification and in which:

Figure 1 is a block diagram, partly schematic, illustrating one embodiment of the invention, Figure 2 is a cross-sectional view, partly cut away, showing a portion of one form of beam intercepting structure for a cathode-ray tube which may be used in the system of the invention.

Referring to Figure 1, the cathode-ray tube system shown therein comprises a cathode-ray tube 10 containing, within an evacuated envelope 12, a conventionally constructed beam generating and accelerating electrode system comprising a cathode 14, a control electrode 16 for varying the intensity of the beam, a focussing electrode 18, and a beam accelerating electrode 20 which may consist of a conductive coating on the inner wall of the envelope and which terminates at a point spaced from the end face 22 of the tube in conformance wtih well-established practice. Suitable heating means (not shown) are provided for maintaining the cathode 14 at its operating temperature. The electrode system so defined is energized from a suitable source of potential shown as a battery 24 having its negative pole connected to ground and its positive pole connected to the electrode 18, and a battery 26 having its negative pole connected to the positive pole of the battery 24 and its positive pole connected to the accelerating electrode 20. In practice the battery 24 has a potential of the order of 1 to 3 kilovolts, and the battery 26 has a potential of the order of 10 to 20 kilovolts. The operating potential of the control electrode 16 may be established by a D.-C. restorer connected to the electrode 16 and consisting of a diode 28 appropriately poled and shunting a grid resistor 30. The cathode 14 may be connected to a point at ground potential as shown.

A deflection yoke 32, coupled to horizontal and vertical deflection circuits of conventional design, is provided for deflecting the generated electron beam across the face plate 22 of the cathode-ray tube to form a raster thereon.

The end face plate 22 of the tube is provided with a beam intercepting structure 34, one suitable form of which is shown in detail in Figure 2. In the arrangement shown in Figure 2 the structure 34 is formed directly on the face plate 22. However, the structure 34 may alternatively be formed on a suitable light transparent base which is independent of the face plate 22 and may be spaced therefrom. The end face 22, which in practice consists of glass having preferably substantially uniform transmission characteristics for the various colors in the visible spectrum, is provided with a plurality of groups of elongated parallelly arranged strips 36, 38 and 40, of phosphor material which, upon impingement by the cathode-ray beam, fluoresce to produce light of three different primary colors. For example, the stripe 36 may consist of a phosphor which produces red light, the stripe 38 may consist of a phosphor which produces green light, and the stripe 40 may consist of a phosphor which produces blue light. Each of the groups of stripes may be termed a color triplet and, as will be noted, the sequence of the stripes is repeated in consecutive order over the area of the structure 34. Suitable materials constituting the phosphor stripes 36, 38 and 40 are well known to those skilled in the art as well as the method of applying the same to the face plate 22, and further details concerning the same are believed to be unnecessary.

In the arrangement specifically shown, the indexing signal is produced by utilizing indexing stripes of a given secondary-emissive ratio differing from the secondary-emissive ratio of the remainder of the beam intercepting structure. For this purpose, the structure 34 further comprises a thin electron permeable conducting layer 42 of low secondary-emissivity. The layer 42 is arranged on the phosphor stripes 36, 38 and 40 and preferably further constitutes a mirror for reflecting light generated at the phosphor stripes. In practice, the layer 42 is a light reflecting aluminum coating which is formed in well known manner. Other metals, such as magnesium and beryllium, capable of forming a coating in the manner similar to aluminum, and having secondary-emissive ratios detectably different from that of the material of the indexing member, may also be used.

Arranged on the coating 42 over consecutive green stripes 38 are indexing stripes 44 consisting of a material having a secondary-emissive ratio detectably different from that of the material of coating 42. The stripes 44 may consist of gold or of another high atomic number metal such as platinum or tungsten or of magnesium oxide as previously pointed out.

The beam intercepting structure so constituted is connected to the positive pole of the battery 26 by means of a suitable lead attached to the aluminum coating 42.

Interposed between the end of the accelerating anode 20 and the beam intercepting structure 22 is an output collector electrode 46 consisting of a ring shaped coating, for example of graphite or of silver, on the wall of the envelope. Electrode 46 is energized through a load resistor 48 from a suitable source 50, shown as a battery. The source 50 may have a potential of the order of 3 kilovolts.

The cathode-ray beam, in its horizontal travel across the beam intercepting structure 34, impinges successively on the coating 42 and the indexing stripes 44. When the beam is varied in intensity at a pilot rate, in a manner later to be more fully pointed out, the scanning beam will generate across the load resistor 48 an indexing signal made up of a component at the pilot frequency and sideband frequency components representing the sum and diffeernce frequencies of the pilot frequency and the rate at which the index stripes are scanne dby the cathode-ray beam.

In a typical case the pilot frequency variations of the intensity of the beam may occur at a frequency of 38.5 mc./sec., and when the rate of scanning the index stripes 44 is approximately 7 million per second, as determined by the horizontal scanning rate and the number of index stripes 44 impinged per scanning period, a modulated signal at 38.5 mc./sec. and heaving sidebands at approximately 31.5 and 45.5 mc./sec. will be produced across load resistor 48. Changes in the rate of scanning of the index stripes 44 due to non-linearities of the beam deflection and/or non-uniformities of the spacing of the index stripes, will produce corresponding changes in the frequencies of the sidebands. Therefore, the signal produced by the intensity variations of the beam at the pilot frequency or a side-band of this signal may be used as an indexing signal indicative of the position of the beam on the surface of the beam intercepting structure 34. In the arrangement specifically shown in Figure 1, the lower sideband, i. e., the sideband at approximately 31.5 mc./sec., is utilized as the indexing signal and this signal is applied through a sideband amplifier and amplitude limiter 52 to a utilization circuit therefor consisting of a mixer 54. Amplifier 52 is of conventional desgin, and is characterized by a band-pass response which transmits and amplifies only signals having a frequency in the range of the above noted lower sideband. The amplifier may embody conventional amplitude limiting means by which any amplitude modulation appearing on the signal may be removed, and the amplifier may be adapted to provide the desired amplification without phase distortion of the applied signal.

For the reproduction of a color image on the face plate of the cathode-ray tube, there are provided color signal input terminals 60, 62 and 64 which are supplied, from a television receiver, with separate signals indicative of the red, green and blue components of the televised scene, respectively. The system then opeartes to effectively convert these three color signals into a wave having the color information arranged in time reference sequence so that the red information occurs when the cathode-ray beam impinges the red stripe 36 of the beam intercepting structure 34, the green information occurs upon impingement of the green stripe 36 and the blue information occurs when the blue stripe 40 is impinged.

The conversion of the color signals into a color wave with sequentially occurring color components may be brought about by a sampling procedure which effectively connects each of the input terminals in sequence with a common output channel, or may be achieved by means of an equivalent modulation system suitably energized by the respective color signals and by appropriately phase related modulation signals. In the arrangement specifically shown, the desired conversion is effected by means of sine wave modulators 66, 68 70 in conjunction with an adder 72. Modulators 66, 68 and 70 may be of conventional form, and may each consist, for example, of a dual grid thermionic tube to one grid of which is applied the color signal from the respective terminals 60, 62 and 64, and to the other grid of which is applied a modulation signal. The modulation signals are derived from a pilot oscillator 74 through a phase shifter 76, the latter being adapted to produce, by means of suitable phase shifting networks, three modulation voltages appropriately phase displaced. In the arrangement specifically described, wherein the phosphor stripes 36, 38 and 40 (see Figure 2) are uniformly distributed throughout the width of each color triplet, the modulation voltages from the phase shifter 76 bear a 120° phase relationship as shown.

The individual waves produced at the outputs of the modulators will be sine waves, each amplitude modulated by the color signal applied to the respective modulators and each having a phase relationship determined by the particular modulation signal applied. The three modulators are coupled with their outputs in common so that the three waves are combined to produce a resultant wave having a frequency equal to that of the oscillator 74 and having amplitude and phase variations proportional to the amplitudes of the color signals. A band-pass filter 78, having a central frequency as determined by the frequency of the modulating signals applied to the modulators, may be arranged in the common output of the modulators to suppress undesirable modulation components.

The pilot oscillator 74 further serves as a source establishing the desired rate of varying the intensity of the cathode-ray beam in accordance with the principles set forth in the above referred to copending application of E. M. Creamer, Jr., et al. Accordingly, the oscillator 74 operates at a frequency outside the frequency spectrum of the video color wave applied to the control electrode 16 of the cathode-ray tube, i. e., at a frequency of 38.5 mc./sec. as above specifically illustrated.

The resultant wave at the common output circuit of modulators 66, 68 and 70 is applied to the mixer 54, together with the indexing signal derived from the amplifier and limiter 52, to produce a heterodyne difference signal having amplitude and phase variations as determined by the amplitudes of the color signals at the terminals 60, 62 and 64 and having further phase (and/or frequency) variations as determined by the variations in the rate of scanning the index stripes of the beam intercepting structure of the cathode-ray tube. It will be noted that, since the desired pilot frequency variations of the intensity of the cathode-ray beam and the modulation of the color signals at terminals 60, 62 and 64 are at the same frequency, the heterodyne difference signal produced by mixer 54 will have a central frequency equal to the average rate of scanning the index stripes, so that each successive color triplet of the structure 34 will be energized by successive cycles of the said difference signal.

Each of the color signals supplied to the input terminals of modulators 66, 68 and 70 will, in general, include a reference level component definitive of brightness. While each modulator may be constructed so as to transmit this reference level component to its output, in practice this is generally not done. Preferably, the three color signals are combined in proper proportions in an adder 72 to yield a single signal representative of the overall brightness of the scene to be reproduced and this signal is in turn supplied to an adder 80 where it is combined with the signal produced in the output of mixer 54.

The signal at the output of the adder 80 thus comprises a reference level component establishing the brightness information of the image to be reproduced and a modulated component establishing the chromaticity of the image. This signal is applied through an adder 82 to the control electrode 16 of the cathode-ray tube to thereby vary the intensity of the cathode-ray beam in time sequence with the scanning of the electron beam over consecutive phosphor stripes of the beam intercepting structure.

In order to further vary the intensity of the beam at a rate producing the desired indexing signal at the collector electrode 46 as the beam scans the indexing stripes 44, there is further applied to the control electrode 16 a signal having a frequency component at a subharmonic of the desired beam intensity variation rate. Such a signal may be derived from a frequency divider 84, the input of which is coupled to the pilot oscillator 74 through an isolation amplifier 86, and the output of which is coupled to control electrode 16 through the adder 82. When the non-linear beam-current versus control-voltage characteristic of the cathode-ray tube approximates a square law relationship, the frequency of the pilot frequency determining signal is preferably equal to one-half of the desired rate of varying the intensity of the beam. In such a case the frequency divider 84 operates with its output at one-half the frequency of the signal applied to the input thereof from the pilot oscillator 74, i. e., in the specific form of the invention shown in Figure 1, the output signal of the divider 84 is 19.25 mc./sec. When the characteristic of the cathode-ray tube approximates a higher and/or more complex order relationship, the divider 84 may be adapted to provide a signal having components at the appropriate subharmonics of the frequency of the pilot oscillator 74.

It is thus seen, that there is applied to the control electrode 16 a video signal having a frequency component at the rate of scanning the color stripes of the beam intercepting structure and a second signal having a component at a frequency which is a subharmonic of the desired pilot rate of varying the intensity of the beam. Due to the non-linear characteristic of the tube, there will be generated not only intermodulation products of the two applied signals but also signals having frequencies which are multiples of the frequencies of the applied signals. In the case of a tube having a square law characteristic, one of the generated signals will have a frequency which is twice the frequency of the applied pilot frequency determining signal, and this generated signal correspondingly varies the intensity of the beam at the desired pilot rate. The heterodyne action produced by the beam as it scans over the index stripes will in turn produce a signal having a carrier component at the pilot frequency and sideband components determined by the rate of scanning over the index stripes. A sideband component, i. e., the sideband at approximately 31.5 mc./sec., may be utilized as an indexing signal.

The system of the invention has the important advantage that, by a suitable choice of the frequencies of the signals applied to the cathode-ray tube, a wide separation of the frequencies of the products appearing at the collector electrode may be realized, so that the desired index signal may be readily separated by simple band-pass filtering elements for example by the sideband amplifier-limiter 52. Furthermore, a relatively large variation of the intensity of the beam at the desired pilot rate, and a correspondingly large indexing signal, may be produced, without necessitating the use of a large pilot frequency determining signal at the control element of the tube, thereby minimizing desaturation effects of the colors of the image.

In some instances, due to a departure of the nonlinear beam-current versus control-voltage characteristic from a strictly exponential relationship, or due to a selection of a pilot frequency determining signal which is not a subharmonic of the desired pilot frequency as determined by the exponential order of the non-linearity of the tube, the intensity variations of the beam at the desired pilot rate may have superimposed thereon variations at the video signal rate. Under these conditions, and in accordance with a further feature of the invention, such secondary variations of the beam may be obviated by applying to the control system of the tube an appropriately phased compensating signal at the pilot frequency. Such a compensating signal, when heterodyned with the video color signal by the cathode-ray tube elements, may be made to vary the intensity of the beam in a sense and by an amount cancelling the superimposed variations at the video signal rate. The compensating signal may be applied to the control electrode 16, for example by means of a phase and amplitude control 88 having its input connected to the isolation amplifier 86 and its output connected to the adder 82.

While I have described my invention by means of specific examples and in a specific embodiment, I do not wish to be limited thereto for obvious modifications will occur to those skilled in the art without departing from the spirit and scope of the invention.

What I claim is:

1. A cathode-ray tube system comprising a cathode-ray tube having a source of an electron beam, control means to vary the intensity of the beam, a beam intercepting structure for producing a first given response upon impingement by said beam, said structure having portions thereof spaced apart and producing a second given response when said beam impinges thereon, and means to produce an output signal indicative of intensity variations of said beam and of said second given response, said control means having a non-linear beam-current versus control-voltage characteristic producing non-linear interaction of the intensity variations of said beam when a plurality of signals are applied to said control means, means for periodically deflecting said beam across the beam intercepting structure to thereby successively scan said beam over said spaced portions, means to apply to said control means first and second signals, said first signal having a frequency spectrum of given maximum extent and being representative of desired variations of said first response, and said second signal having a component at a frequency greater than the maximum frequency of said first signal, and means to derive from said output signal means an output wave having a component at a frequency established by a harmonic of the frequency of said component of said second signal and by the rate of scanning of said beam over said spaced portions.

2. A cathode-ray tube system as claimed in claim 1, wherein said non-linear characteristic of the said control means approximates a square law relationship, and the said component of the said output wave has a frequency established by the second harmonic of said second signal component and by the rate of scanning of said beam over said spaced portions.

3. A cathode-ray tube system as claimed in claim 2, further comprising means to apply to said control means a third signal having a frequency equal to the second harmonic of the frequency of said second signal component.

4. A cathode-ray tube system for producing a color television image, comprising a cathode-ray tube having a source of an electron beam, control means to vary the intensity of the beam, a beam intercepting structure comprising consecutively arranged portions, each comprising a plurality of stripes of fluorescent material, each of said stripes producing light of a different color upon impingement by said beam, said structure having second portions thereof spaced apart and comprising a material having a given response characteristic when said beam impinges thereon, and means to produce an output signal indicative of intensity variations of said beam and of the said given response characteristic, said control means having a non-linear beam-current versus control-voltage characteristic producing non-linear interaction of the intensity variations of said beam when a plurality of signals are applied to said control means, means for periodically deflecting said beam across the beam intercepting structure to thereby scan said beam over said first and second portions, means to apply first and second signals to said control means, said first signal comprising a video color wave having a frequency spectrum of a given maximum extent and including a component having a frequency within said spectrum approximating the rate of scanning said first portions, said second signal having a component at a frequency greater than the maximum frequency of said first signal, and means to derive from said output signal means an output wave having a component established by a harmonic of the frequency of said second signal component and by the rate of scanning of said beam over said spaced portions.

5. A cathode-ray tube system for color television as claimed in claim 4, wherein said non-linear characteristic of the said control means approximates a square law relationship and the said component of said output wave has a frequency established by the algebraic sum of the second harmonic frequency of said second signal component and a frequency approximating the rate of scanning of said beam over said spaced portions.

6. A cathode-ray tube system for color television as claimed in claim 5, further comprising means to apply to said control means a third signal having a frequency equal to the second harmonic of the frequency of said second signal component.

7. A cathode-ray tube system for producing a color television image, comprising a cathode-ray tube having a source of an electron beam, control means to vary the intensity of the beam, a beam intercepting structure comprising consecutively arranged first portions each comprising a plurality of stripes of fluorescent material, each of said stripes producing light of a different primary color upon impingement by said beam, said structure having second portions thereof spaced apart and comprising a material having a given response characteristic when said beam impinges thereon, and means to produce an output signal indicative of intensity variations of said beam and of the said given response characteristic, said control means having a non-linear beam-current versus control-voltage characteristic producing non-linear interaction of the intensity variations of said beam when a plurality of signals are applied to said control means, means for periodically deflecting said beam across said beam intercepting structure to thereby successively scan said beam over the said first and second portions, means to generate a first wave of a given first frequency, means to produce a first color video signal having a component at the frequency of said first wave, means for combining said first color video signal and said output signal to produce a second color video signal having a component at a frequency approximating the rate of scanning of said first portions, means to generate a second wave having a frequency equal to a subharmonic of the frequency of said first wave, means to apply said second color video signal and said second wave to said control means, and means to derive from said output means said output signal having a frequency equal to the algebraic sum of a frequency equal to a harmonic of the frequency of said second wave and a frequency approximating the rate of scanning said beam over said spaced portions.

8. A cathode-ray tube system for color television as claimed in claim 7, wherein said means to generate said second wave comprises a frequency dividing system coupled to said means to generate said first wave, and further comprising phase and amplitude control means coupled to the generating means of said first wave and to said control means to apply to said control means a third wave at the frequency of said first wave.

STEPHEN W. MOULTON.

References Cited in the file of this patent

UNITED STATES PATENTS

| Number | Name | Date |
|---|---|---|
| 2,415,059 | Zworykin | Jan. 28, 1947 |
| 2,490,812 | Huffman | Dec. 13, 1949 |
| 2,530,275 | Weingarten | Nov. 14, 1950 |
| 2,530,431 | Huffman | Nov. 21, 1950 |
| 2,545,325 | Weimer | Mar. 13, 1951 |